A. C. WICKMAN.
SPRINGING OF MOTOR ROAD VEHICLES.
APPLICATION FILED MAY 3, 1918.
1,307,605.
Patented June 24, 1919.
5 SHEETS—SHEET 1.
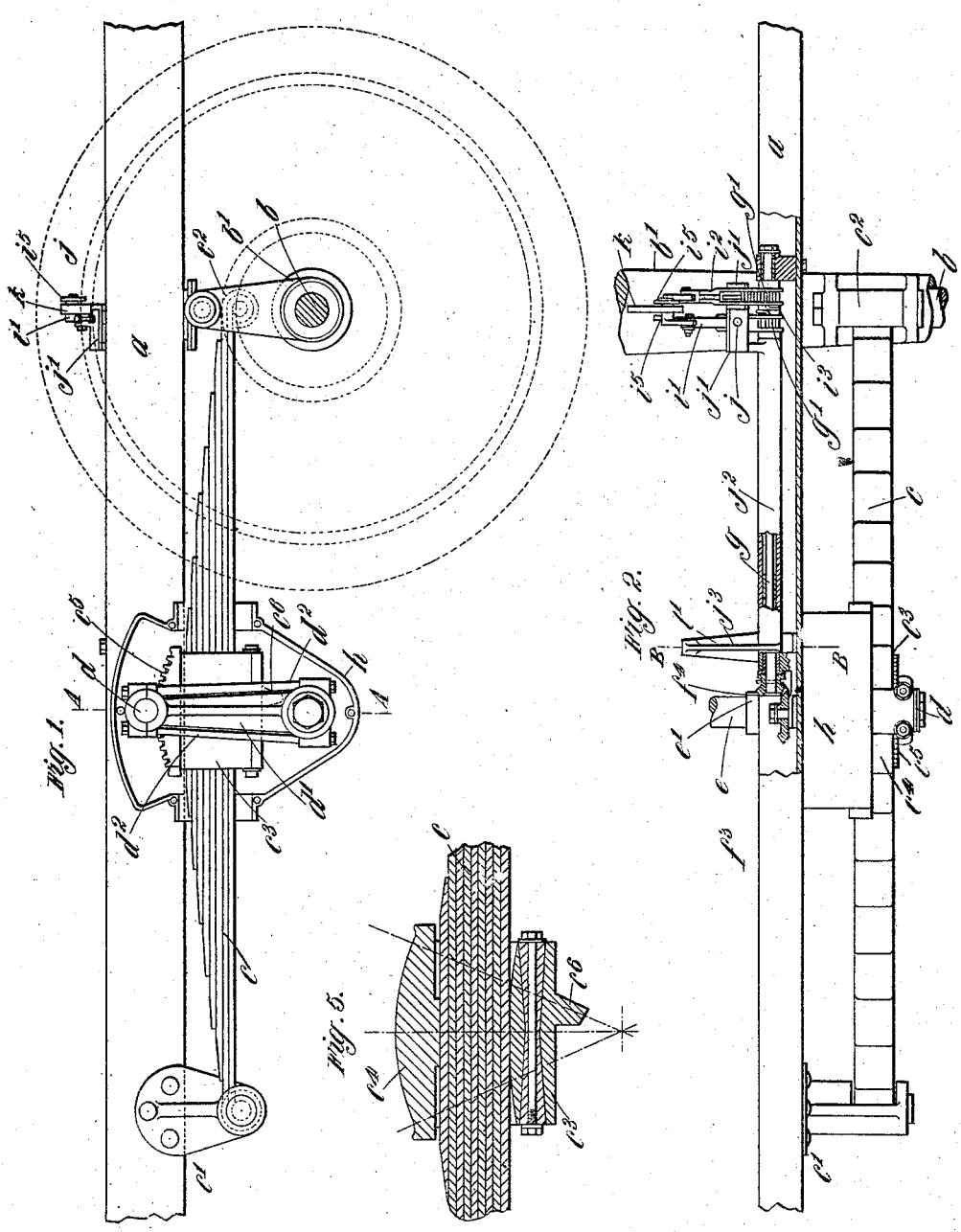

A. C. WICKMAN.
SPRINGING OF MOTOR ROAD VEHICLES.
APPLICATION FILED MAY 3, 1918.
1,307,605.
Patented June 24, 1919.
5 SHEETS—SHEET 2.
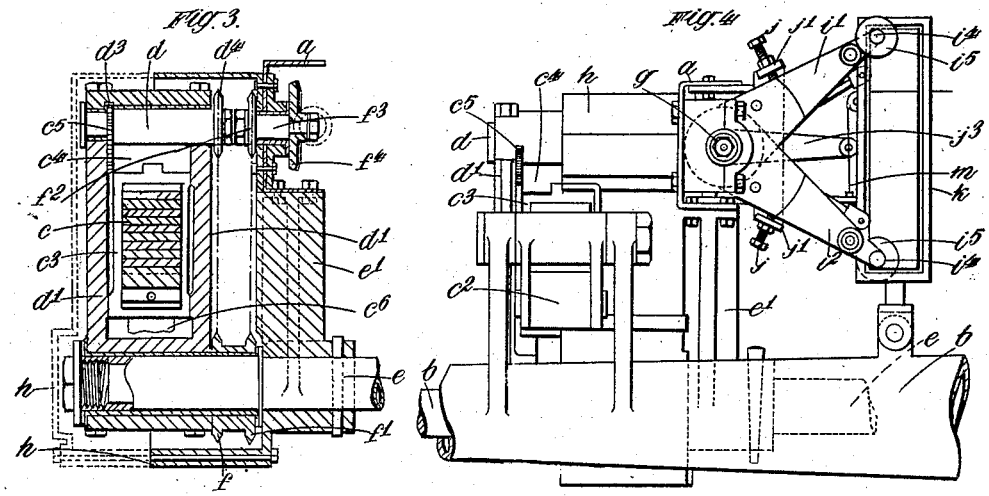
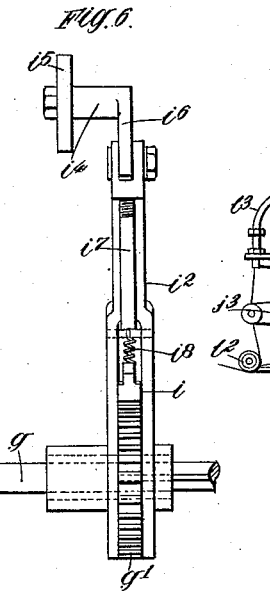
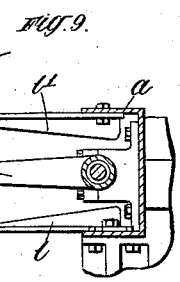
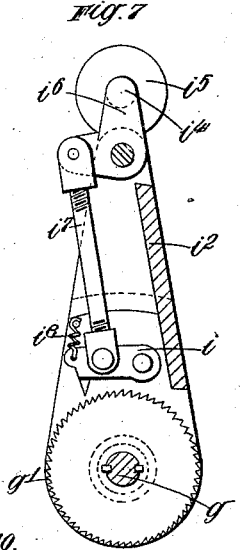
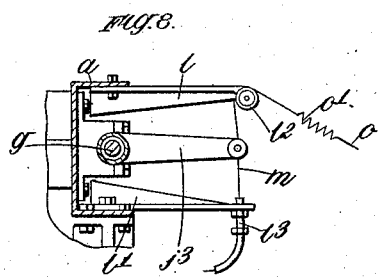
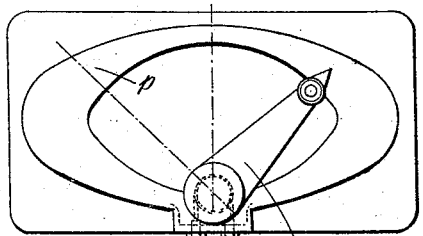

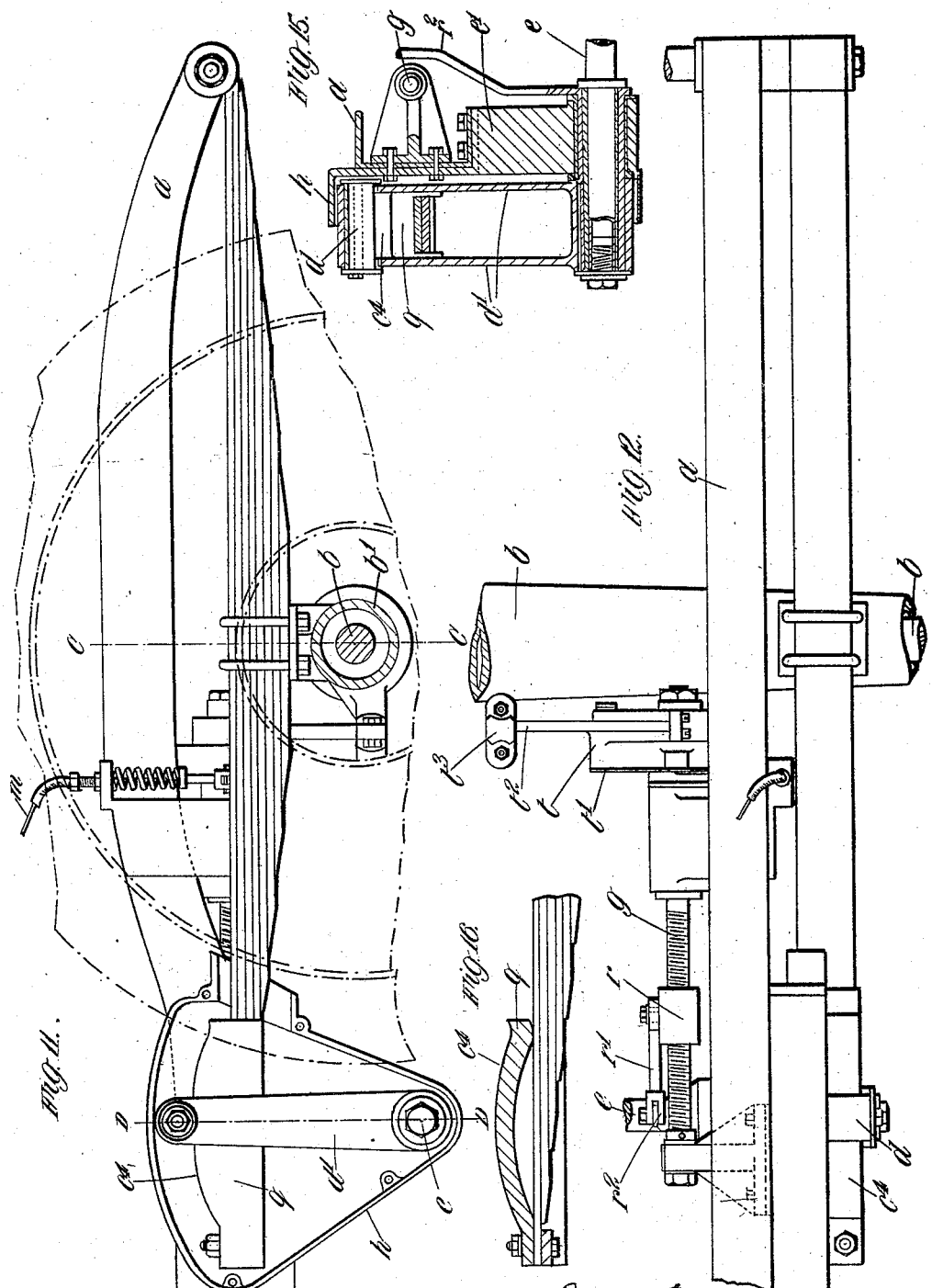

A. C. WICKMAN.
SPRINGING OF MOTOR ROAD VEHICLES.
APPLICATION FILED MAY 3, 1918.
1,307,605.
Patented June 24, 1919.
5 SHEETS—SHEET 4.
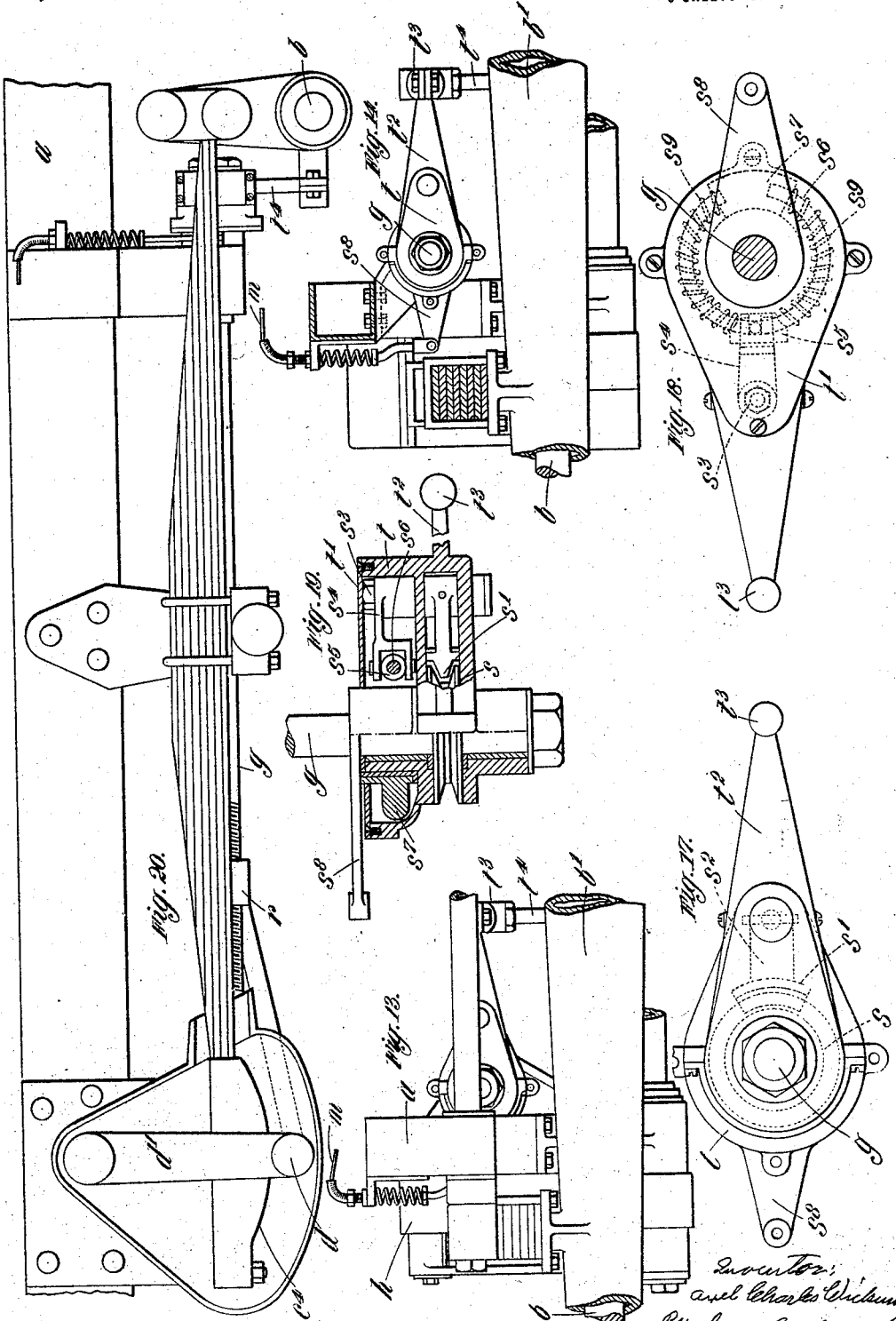

A. C. WICKMAN.
SPRINGING OF MOTOR ROAD VEHICLES.
APPLICATION FILED MAY 3, 1918

1,307,605.

Patented June 24, 1919.
5 SHEETS—SHEET 5.

UNITED STATES PATENT OFFICE.

AXEL CHARLES WICKMAN, OF BRIGHTON, ENGLAND.

SPRINGING OF MOTOR ROAD-VEHICLES.

1,307,605.        Specification of Letters Patent.     Patented June 24, 1919.

Application filed May 3, 1918. Serial No. 232,352.

*To all whom it may concern:*

Be it known that I, AXEL CHARLES WICKMAN, a subject of the King of Great Britain, residing at 6 Alexandra Villas, Brighton, in the county of Sussex, England, have invented certain new and useful Improvements in or Relating to the Springing of Motor Road-Vehicles, of which the following is a specification.

The present invention relates to the springing of motor road vehicles in which leaf springs are employed, such as cantaliver springs, or semi-elliptic springs, and the main object of the said invention is to provide in a very efficient manner for automatic variation of the rate or period of vibration of the springs according to the load.

According to the said invention means are provided with the object aforesaid for automatically causing actual movement and change of operative position relatively to the spring of a part or member about which the spring flexes, such as the member acting as the fulcrum in a cantaliver spring or a part or member abutting against a semi-elliptic spring near one of its ends by means of which the spring is connected to the chassis. This arrangement is in distinction to those already known in connection with a cantaliver spring in which the spring or a member fixed to it merely bears against a curved block or member fixed to the chassis so that as the spring flexes in consequence of either variation of load or the vehicle passing over inequalities in the road the position of the fulcrum or place of contact of the spring with the block changes. Means are also preferably provided according to the present invention whereby the deflection of the spring under normal or standard load may be varied by hand adjustment or control of the action of the automatically acting devices. By these means the vehicle may be run on light springing or heavy springing as desired, such means not interfering with the automatic adjustment described. Thus not only is the strength of the springs automatically varied according to the load within a range of certain extent but the range may be controlled and changed by hand, that is, the position of the axle relatively to the chassis or the neutral line of the spring, when under standard load may be raised or lowered as desired.

In the preferred embodiments of the said invention the spring is provided with an arcuate bearing surface on its upper side on which bears a roller constituting the aforesaid member or part about which the spring flexes. This roller is carried by a member that may turn on a fixed bearing below the spring to change the position of the said roller on the said arcuate surface. The roller carrying member is operated through suitable gearing by mechanism actuated by the reciprocations of the axle in passing over inequalities in the road. This mechanism may comprise a vertical slotted member or link carried by the axle in which link the free ends of two levers carried on a shaft are located and springs are provided to press the lever ends respectively toward the two ends of the link and against adjustable fixed stops, consequently, as the link moves upwardly and downwardly the levers will be respectively turned upwardly and downwardly, the said springs returning the levers to their normal positions against the stops. Each lever in its movement caused by the link operates a ratchet fixed on the aforesaid shaft, the two ratchets being oppositely arranged so that one lever in its movement rotates the shaft in one direction and the other lever in the reverse direction. When the load is normal or standard, that is, when the axle and springs are in neutral position and the free ends of the levers are the same distance from the respective ends of the link nearer to them respectively, the levers are operatively turned an equal distance in opposite directions as the link reciprocates and so the shaft is merely turned slightly an equal distance in reverse directions. Should, however, at any time the load be such that the said link is in such position that the free end of one lever is a greater distance from the adjacent end of the link than the end of the other lever is from its adjacent link end, then as the link reciprocates one lever is turned more than the other and the aforesaid shaft rotates mainly in one direction thus causing change of position of the fulcrum member until the flexing of the spring is such that the ends of the said levers are again symmetrically located in the link. The aforesaid stops for the levers are carried by a member that may be turned by hand thus varying the position of the free ends of the levers relatively to the link whereby the neutral position of the axle and link is changed by the next few reciprocations of the link.

Instead of the aforesaid link, levers and ratchets a friction device may be employed comprising a friction wheel on the aforesaid shaft and a reciprocatory friction block coacting with it and actuated by reciprocations of the axle. The said friction block is so arranged that in one reciprocation it may turn the shaft equally in each direction or more in one direction than the other according to the position of the axle relatively to the chassis. In this arrangement the neutral position of the axle or the neutral line of the spring may be changed by adjusting and controlling the action of the friction block aforesaid.

In order that the nature of the said invention and the manner in which it may be put in practice may be clearly understood it is hereinafter particularly described with reference to the accompanying drawings which by way of example illustrate the embodiment hereinbefore briefly described in connection with a cantaliver spring and a semi-elliptic spring.

Figures 1 to 10 of the said drawings illustrate an embodiment of the said invention with a cantaliver spring and comprising the aforesaid ratchet devices, Fig. 1 being a side view, Fig. 2 a plan partly in section, Fig. 3 a section taken on the line A, A Fig. 1, Fig. 4 an end view looking from the right hand of Fig. 1. Fig. 5 is a vertical section taken through the clip of the spring, Fig. 6 an edge view of one of the levers actuated by the axle and Fig. 7 a sectional side view thereof, Fig. 8 is a side view of the devices by which the normal position of the levers actuated by the axle may be varied, taken on the line B, B Fig. 2. Fig. 9 is a similar view of the like devices in connection with the back axle spring on the other side of the vehicle and Fig. 10 is a face view of the dial and operating lever of the said devices mounted on the dash. Figs. 3 to 10 are drawn to a larger scale than Figs. 1 and 2.

Figs. 11 to 19 of the accompanying drawings illustrate an embodiment of the said invention with a semi-elliptic spring and in which is employed the aforesaid friction device as part of the means for operating the movable fulcrum member or part about which the spring flexes; Fig. 11 being a side view, Fig. 12 a plan, Fig. 13 an end view from the right hand Fig. 11, Fig. 14 a section on the line C C Fig. 11, Fig. 15 a section on the line D D Fig. 11, Fig. 16 a detail section through the part secured to the spring that carries the arcuate bearing surface for the fulcrum member, Fig. 17 a face view of the friction operating device looking from the right hand of Fig. 12, Fig. 18 a face view of the same looking in the reverse direction and Fig. 19 is part plan and part horizontal section of the same. Figs. 17, 18 and 19 are drawn to a larger scale than Figs. 11 to 16.

Fig. 20 is a diagrammatic side view of a modification.

Figure 21:
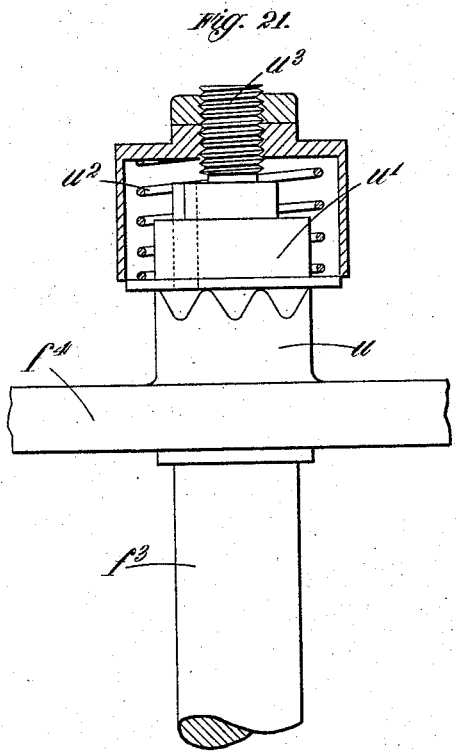
Figs. 21 and 22 are plan views partly in section of safety slip devices for the mechanism as hereinafter described.

In the following description the parts of the said figures are referred to by the letters and numerals marked thereon, the same letters and numerals indicating like or equivalent parts in all the said figures.

Referring to Figs. 1 to 10, $a$ is a portion of the chassis of the motor road vehicle, $b$ is the back axle and $c$ is the cantaliver spring. The spring $c$ is pivotally connected at $c'$ to the chassis and at $c^2$ to the back axle casing $b'$. Intermediately the spring $c$ is secured in a clip $c^3$ having an arcuate surface $c^4$ on its upper side and provided with wedges, a screw bolt and nut and bearing piece with arcuate upper bearing surface at its lower part, to secure the spring in place in the clip (see Fig. 5). $d$ is a roller constituting a movable fulcrum member about which the spring flexes and against which the arcuate surface $c^4$ bears. The fulcrum member $d$ works in bearings at the upper part of a pair of arms $d'$ $d'$ having at bottom a bearing working on a shaft $e$ crossing from side to side of the vehicle and fixed in hanging brackets secured to the chassis one of which is shown at $e'$ in Figs. 3 and 4. The caps of the said bearings are secured by the bolts $d^2$ $d^2$ see Fig. 1. The arcuate surface $c^4$ has a radial curve struck from the center of the shaft $e$. The load is therefore transmitted through the shaft $e$ to the fulcrum member $d$ which nevertheless may be moved into any position on the arcuate surface $c^4$. The fulcrum member $d$ is provided with a toothed pinion $d^3$ (see Fig. 3) meshing with a curved rack $c^5$ secured to the upper part of the side of the clip $c$ so that the pitch line of the teeth is coincident with the arcuate surface $c^4$. The clip $c$ is located between the pair of arms $d'$ $d'$ (see Fig. 3) and is provided at bottom with a lug $c^6$ which normally bears on the upper part of the bearing at the lower part of the said arms and to one side of the center of the said bearing. This lug $c^6$ is provided to prevent sudden upward movement of the chassis causing the fulcrum member $d$ to rise materially above the arcuate surface $c^4$ and so possibly causing unmeshing of the pinion $d^3$ and rack $c^5$ and the said lug is disposed to one side of the axis of the shaft $e$ in order that it should not interfere with the flexing of the spring. The inner end of the fulcrum member $d$ is provided with a sprocket $d^4$ which is geared by chain to one ($f$) of two sprockets $f$ $f'$ integral with, or secured to, one another and free to rotate on the shaft $e$. The other sprocket $f'$ is geared by chain to a sprocket $f^2$ on a short shaft $f^3$ working in a bearing secured to the chassis. The shaft $f^3$ is geared by bevel gear $f^4$ with a longitudinal shaft $g$ working in bearings secured to the inner side of the chassis. The clip $c$ and parts connected therewith are inclosed in a casing $h$ in two parts bolted together the inner part being in one with the bracket $e'$. The outer part is not shown in Figs. 1, 2 and 4 but is indicated in broken lines in Fig. 3. The springs might also be inclosed in a flexible leather cover fastened to lugs on the said casing. On the rear part of the shaft $g$ are secured two ratchet wheels $g'$ $g'$ the teeth of which are oppositely arranged, and co-acting with each of the said ratchet wheels is a pawl $i$ carried in the one case by a lever $i'$ and in the other case by a lever $i^2$. The levers $i'$ $i^2$ are free to rotate on the shaft $g$ and a spring $i^3$ (see Fig. 2) is arranged between and connected to them to keep them normally angularly separated within limits. These limits are formed by adjustable screws $j$ $j$ acting as stops and carried by arms $j'$ $j'$ on a tubular shaft $j^2$ working on the shaft $g$. To the casing $b'$ of the back axle $b$ is secured a vertical link $k$ in which pins $i^4$ $i^4$ at the ends of the levers $i'$ $i^2$ are located. At the outer end of each of the said pins $i^4$ $i^4$ is a collar or washer $i^5$ to prevent displacement of the said pins from the link $k$ and each of the pins $i^4$ $i^4$ is formed on one arm of a bell crank lever $i^6$ fulcrumed on the body of the lever $i'$ or $i^2$ as the case may be (see Figs. 6 and 7). To the other end of the bell crank lever $i^6$ is pivoted a rod $i^7$ which is pivoted at its other end to the pawl $i$ a spring $i^8$ being provided to normally keep the said pawl out of engagement with its ratchet wheel. The said rod $i^7$ pawl $i'$ and spring $i^8$ are located in a recess in the lever on which they are mounted as illustrated in Figs. 6 and 7. On the shaft $j^2$ is secured a lever $j^3$ and above and below it arms $l$ $l'$ are secured to the chassis (see Fig. 8). The arm $l$ has a roller $l^2$ at its end. A Bowden wire $m$ is secured to the end of the lever $j^3$ and passes through a guide tube $l^3$ at the end of the arm $l'$ whence it passes to and over the shaft of the operating handle $n$ on the dash see Fig. 10. The Bowden wire is pinned to the said shaft and passes to the devices on the other side of the vehicle, passing through the guide tube $l^3$ (see Fig. 9) at the end of the arm $l'$ (which in this case is above the arm $l$), to the end of the lever $j^3$ to which it is secured. The two levers $j^3$ $j^3$ are also connected together by the Bowden wire $o$ which passes over the rollers $l^2$ $l^2$ and is provided in its length with the helical spring $o'$. As therefore the handle $n$ is moved over the dial $p$ on the dash the two levers $j^3$ $j^3$ one on each side of the vehicle are caused to move upwardly or downwardly to the same extent thus turning the shaft $j^2$ on each side of the vehicle and the arms $j'$ $j'$ and stops $j$ $j$ carried by each of the said shafts. Means are provided, such as a set screw on the handle $n$ or a spring detent thereon co-acting with notches in the dial $p$, to retain the handle $n$ in its adjusted position.

When the axle reciprocates or moves upwardly and downwardly relatively to the chassis due to the vehicle passing over inequalities in the road, the link $k$ causes first one of the levers $i'$ $i^2$ and then the other to turn on the shaft $g$ as the ends of the link strike and bear against the pins $i^4$ $i^4$ at the ends of the said levers. In the case of each lever the link only actuates it in one direction, this direction being opposite in the case of one lever to that in the case of the other and the levers are returned toward the ends of the link $k$ by the spring $i^3$. As each lever $i'$ $i^2$ is moved by the link $k$ through the pin $i^4$ the bell crank lever $i^6$ is slightly turned thus causing the spring pawl $i$ to engage the teeth of the ratchet with which the lever co-acts. When the load is of the predetermined normal or standard amount and the axle is not materially vibrating the pins $i^4$ $i^4$ are each at the end of the said link or the same distance therefrom, therefore when the axle reciprocates the two levers are successively moved an equal distance; consequently the shaft $g$ is first rotated slightly in one direction and then in the other. As the shaft $g$ rotates it causes, through the gearing $f^4$ $f^2$ $f'$ $f$ $d^4$ the fulcrum member $d$ to rotate or turn and in consequence of the pinion $d^3$ and rack $c^5$ rotation of the said member results in rolling it over the arcuate surface $c^4$ and so changing its position relatively to the ends of the spring $c$. It will be understood that when the load is normal reciprocation of the axle results in no effective movement of the portion of the fulcrum member $d$ because in each reciprocation of the axle the shaft $g$ is turned successively an equal distance in each direction. If however the load is below or above the normal, the end of one lever is nearer the middle of the link than the other because the levers are limited in their movements toward the ends of the link. Consequently in this circumstance as the axle reciprocates one of the levers $i'$ $i^2$ is actuated to a greater degree than the other because in the case of one lever the link has to travel a greater distance before it meets the pin $i^4$ than it does in the case of the other lever. The result is that the shaft $g$ is turned to a greater extent in one direction than the other and moves the fulcrum member $d$ gradually to a position in which the springing is made stiffer or weaker as the case may require, it being understood that the arrangement is such that the said fulcrum member is moved in the proper direction for the purpose. As the fulcrum member $d$ is moved, the position of the link $k$ or its path of reciprocation relatively to the levers $i'$ $i^2$ is changed until the ends of the said levers are actuated equally. It will be understood that the fulcrum member $d$ acts as the fulcrum about which the spring $c$ flexes and as it is moved from the front end of the arcuate surface $c^4$ to the rear so the spring $c$ is rendered stiffer in action.

In order to avoid unnecessary action and consequent wear of the parts where the load is but slightly varied the stops may be adjusted to limit the spring movement of the levers $i'$ $i^2$ angularly away from each other to a greater extent than is illustrated so as to provide a clearance between the pins $i^4$ and the ends of the link $k$. When this is done a certain amount of inoperative movement of the link is permitted.

In Fig. 4 of the accompanying drawings the arms $j'$ $j'$ and stops $j$ $j$ are shown in their normal position that is their position in which reciprocation of the axle is ineffective when the load is the normal or standard for which the vehicle is designed for roads of average quality. In this position of the said arms and stops the effect of the springing is automatically varied to suit any variation of the load with relation to the said normal or standard load and the position of the fulcrum member $d$ for such load. In some cases, however, as for instance where the roads over which the vehicle is to be run are better or worse than usual it may be desired to render the springing stiffer or weaker, that is, to raise or lower the neutral line of the spring, under normal or standard load. To effect this the operating handle $n$ on the dash is turned over the dial $p$ with the result that the tubular shaft $j^2$ and arms $j'$ $j'$ and stops $j$ $j$ are angularly turned up or down equally on both sides of the vehicle in consequence of the Bowden wire gear and a clearance is brought about between one of the levers $i'$ $i^2$ and the adjacent end of the link $k$ and subsequent reciprocation of the axle effects rotation of the shaft $g$ more in one direction than the other as hereinbefore explained and the fulcrum member $d$ is displaced to the proper position to produce the desired stiffer or weaker springing.

In the semi-elliptic spring arrangement Figs. 11 to 19 the fulcrum member $d$ and arcuate bearing surface $c^4$ are at the fore end of the spring which at that part supports the chassis through their medium. The arcuate bearing surface $c^4$ is formed on a part $q$ which is secured by screw bolts and nuts to the end part of the spring. The part $q$ bears on the upper surface of the spring but is otherwise free at its inner end to permit flexing of the spring—see Fig. 16. The shaft $g$ is screw-threaded for part of its length (see Fig. 12) and on this portion works a screw nut $r$ which is connected by a link $r'$ to an arm $r^2$ in one with or fixed to the arms $d'$ $d'$ and the tubular bearing on the shaft $e$. Therefore as the nut $r$ travels to and fro the roller $d$ is moved over the surface $c^4$. In the arrangement now being described the shaft $g$ is rotated in one or other direction by reciprocation of the axle by means of the friction device comprising a grooved friction wheel $s$ secured to the said shaft and the friction block $s'$ that works in the groove of the said wheel $s$ to rotate it. The friction block $s'$ is carried by an arm on a member $s^2$ secured on a bolt $s^3$ in bearings in a casing $t$ having a cover $t'$. This casing has a bearing on the shaft $g$ and is free to turn thereon. On the casing $t$ is a lever arm $t^2$ which by means of a ball and socket joint at $t^3$ is jointed to a rod $t^4$ secured to the back wheel casing. On the bolt $s^3$ there is secured a forked arm $s^4$, the fork of which embraces and is pinned to a collar $s^5$ sliding on a circularly curved rod $s^6$ the ends of which are secured in a projection $s^7$ on the hub of a crank or lever arm $s^8$ which may turn on a tubular extension of the casing $t$—see Fig. 19. Around the rod $s^6$ on each side of the collar $s^5$ there is a helical spring $s^9$ between the said collar and the projection $s^7$. The springs $s^9$ $s^9$ are of equal strength. When the arm $t^2$ is reciprocated by the axle the casing $t$ with the bolt $s^3$ mounted in it are turned, whereupon the crank $s^8$ being stationary one of the springs $s^9$ is compressed slightly against the collar $s^5$ pushing it along the rod $s^6$ against the resilience of the other spring $s^9$. This action tilts the arm $s^4$, member $s^2$ and friction block $s'$ causing the latter to bear at one part on the wheel $s$ and turn it slightly. Should the load be the normal or standard for which the vehicle is designed the relation of the parts is such that the friction block is in the position shown and the springs $s^9$ are under equal stress. Therefore reciprocation of the axle produces equal movements of the collar $s^5$ and friction block $s'$ in each direction. Should however, the load be such that the lever arm $t^2$ is below or above the position shown one of the springs is compressed more than the other thereby initially tilting or tending to tilt the friction block $s'$ in one direction with the consequence that when the axle reciprocates the friction block engages the friction wheel more rapidly in that direction than the other thereby rotating the friction wheel to a greater extent in the said direction. It will be understood that the springs $s^9$ do not turn the wheel $s$ by means of their pressure acting on the block $s'$ but only serve to rock the arm carrying the said block, which block is then automatically self-jamming the friction depending on the torque exerted through the arm $t^2$. This jamming action is caused by the fact that the block $s'$ tends to turn about the center of $s^3$ while it would be constrained to move in a path the center of which is that of the shaft $g$. In order to change the position of the neutral line of the spring under normal or standard load the crank $s^8$ is turned up or down to the requisite extent by means of the Bowden wire $m$ whereby the projection $s^7$ causes one of the springs $s^9$ to move the collar $s^5$ along the rod $s^6$ and so move the friction block $s'$ into such a position that it more readily engages the friction wheel $s$ in one direction than the other, the result being that reciprocation of the axle then produces resultant rotation of the shaft $g$ until the fulcrum member $d$ is moved to the extent necessary to result in the springs $s^9$ again being under equal compression notwithstanding that the normal distance between the axle and chassis has been varied.

In this arrangement the Bowden wires $m$ for the devices on each side of the vehicle are pinned to the shaft of the handle $n$ on the dash and engaged therewith in similar directions so that on turning the handle in one direction both wires are acted on to raise or lower the cranks $s^8$ together.

Although we have hereinbefore described and illustrated in the accompanying drawings the use of a friction device for rotating the shaft $g$ in the case of the application of the said invention to a semi-elliptic spring, and the use of a ratchet device for rotating the said shaft in the case of the application of the said invention to a cantaliver spring, yet the said ratchet device may be used with a semi-elliptic spring and the friction device with a cantaliver spring.

The said invention has hereinbefore been described and illustrated in Figs. 1 to 10 in the accompanying drawings as applied to the main fulcrum of a cantaliver spring but in the case of such a spring the invention may be applied to that end of the spring which is connected to the vehicle about which point of connection the spring flexes as well as from its said fulcrum. The arrangement of parts used in this case may conveniently be similar to that hereinbefore described and illustrated in Figs. 11 to 19 of the accompanying drawings in a semi-elliptic spring. Fig. 20 of the said drawings illustrates in side view somewhat diagrammatically the said invention applied to and embodied in a cantaliver spring in such manner. By examination of the said figure it will be observed that in so applying the said invention the casing $h$ and arms $d''$ $d'$ are reversed so that the shaft $e$ is above the spring instead of below, and the arcuate bearing surface is below the spring as is necessary.

Figure 22:
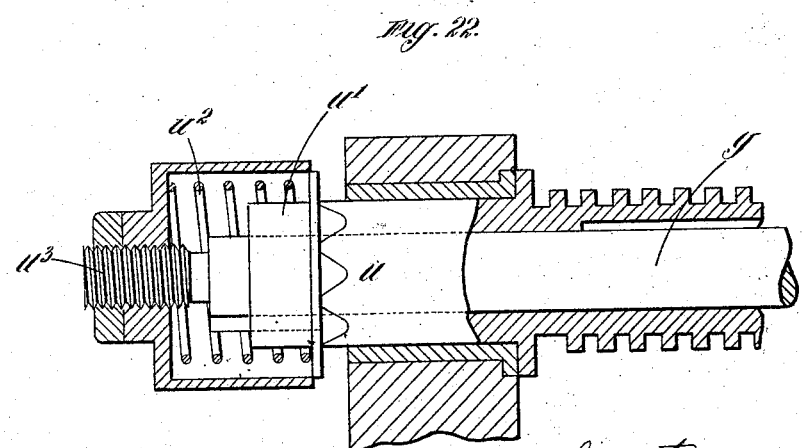

In order to avoid injury to the automatic mechanism in case an excessive load be put on the vehicle it is desirable to provide devices whereby if and when the gearing by which the member $d$ is operated would otherwise be subjected to stress above a certain degree the automatic mechanism is freed until the load is suitably reduced. The said devices may be in the nature of safety slipping arrangements interposed in or part of the said gearing. Two forms of the said arrangements are illustrated respectively in Figs. 21 and 22, that illustrated in Fig. 21 being for use with bevel and sprocket gearing as employed in the mechanism illustrated in Figs. 1 to 10, and the arrangement illustrated in Fig. 22 being for use with screw and screw nut gearing so employed in the mechanisms illustrated in Figs. 11 to 20. In each arrangement there is comprised members $u$, $u'$ having interengaging toothlike or undulatory projections, the member $u'$ being capable of axial movement against the resilience of a spring $u^2$. In the arrangement illustrated in Fig. 21 the member $u$ is secured to one of the bevel gears $f^4$ while the member $u'$ is axially slidable on the shaft $f^3$ but incapable of rotation thereon. The result is that when the shaft $f^3$ cannot rotate, although rotative power is being applied to the bevel gear $f^4$, the projections on the member $u'$ ride over those on the member $u$ forcing that member back against the resilience of its spring $u^2$. The power of the said spring therefore governs the degree of driving power at which the bevel gear $f^4$ is inoperative to rotate the shaft $f^3$. In the arrangement illustrated in Fig. 22 the screw thread with which the nut $r$ coacts is not formed on the shaft $g$ but is on a tubular part in one with the member $u$. The member $u'$ is slidably keyed on the shaft $g$. The drive from the shaft $g$ is therefore through the members $u$, $u'$ to the nut $r$ and if the nut $r$ cannot move although the shaft $g$ is still being rotated the projections on the member $u'$ ride and slip over these on the member $u$ against the resilience of the spring $u^2$. In each case $u^3$ is a fixed bearing pin for the end of the shaft $f^3$ or $g$.

What I claim and desire to secure by Letters Patent of the United States is:—

1. The combination in a motor vehicle of a leaf spring, a movable member about which the spring flexes, and automatically operative means for changing the position of the said member relatively to the spring according to the load.

2. The combination in a motor vehicle of a leaf spring, a movable member about which the spring flexes, and means for changing the position of the said member relatively to the spring according to the load which is automatically operated by reciprocation of the axle relatively to the chassis.

3. The combination in a motor vehicle of a leaf spring, a movable member about which the spring flexes, a shaft to which the said member is geared, and means connected with the axle of the wheel and operated by reciprocation of the said axle relatively to the chassis to rotate the said shaft in one or other direction, according to the load, to change the position of the said member.

4. The combination in a motor vehicle of a leaf spring, a movable member about which the spring flexes, a shaft to which the said member is geared, a friction wheel on the said shaft, a pivoted friction block co-acting with the said wheel, springs controlling the position of the said friction block relatively to the said wheel and according to the load, and means connected with the axle and operated by reciprocation of the axle relatively to the chassis to reciprocate the said friction block to rotate the said wheel and shaft in one or other direction and move the said member according to the load.

5. The combination in a motor vehicle of a leaf spring, a member about which the spring flexes, automatically operative means for changing the position of the said member according to the load, and means operable by hand to adjust the neutral line of the spring for standard load.

6. The combination in a motor vehicle of a leaf spring, a member about which the spring flexes, automatically operative means for changing the position of the said member according to the load actuated by reciprocation of the axle, and means operable by hand to control and adjust the action of the parts actuated by reciprocation of the axle, to cause said reciprocation to change the position of the neutral line of the spring under standard load.

7. The combination in a motor vehicle, of a leaf spring, a movable member about which the spring flexes, mechanical connections between the said member and axle for causing change of the position of the said member by reciprocation of the axle relatively to the chassis, and means actuated by hand for controlling and adjusting the action of the said mechanical connections and consequently the position of the said member to adjust the neutral line of the spring under standard load.

8. The combination in a motor vehicle of a leaf spring, a movable member about which the spring flexes, a shaft to which the said member is geared, a friction wheel on the said shaft, a pivoted friction block co-acting with the said wheel, springs controlling the position of the said friction block relatively to the said wheel and according to the load, means connected with the axle and operated by reciprocation thereof relatively to the chassis to reciprocate the said friction block and rotate the said wheel and shaft to move the said member, and hand operable means for varying the spring control of the said friction block, to cause reciprocation of the axle to move the said member to change the position of the neutral line of the vehicle spring under standard load.

9. The combination in a motor vehicle of a leaf spring, a member about which the spring flexes, mechanical connections between the said member and the axle and operated by reciprocation of the said axle relatively to the chassis, adjustable means for controlling the action of the said reciprocation on the said member to cause said reciprocation to bring about change of position of the neutral line of the spring under standard load and mechanical connections between the said adjustable means and a device within reach of the driver's seat to enable the driver to operate said means.

10. The combination in a motor vehicle of a leaf spring, a movable member about which the spring flexes, mechanical connections between the axle of the wheel and the said member operated by reciprocation of the axle relatively to the load to move the said member according to the load, and a device to render said reciprocation inoperative to move the said member when the said connections would otherwise be subject to excessive stress.

11. The combination in a motor vehicle of a leaf spring, a movable member about which the spring flexes, mechanical connections between the axle of the wheel and the said member, operated by reciprocation of the axle relatively to the load to move the said member according to the load, said mechanical connections comprising members interengaging by means of projections and held together by spring action, said projections being shaped so that those on one member may ride over those on the other member against the said spring action when the stress is excessive.

AXEL CHARLES WICKMAN.

Copies of this patent may be obtained for five cents each, by addressing the "Commissioner of Patents, Washington, D. C."